Figures 1, 2:
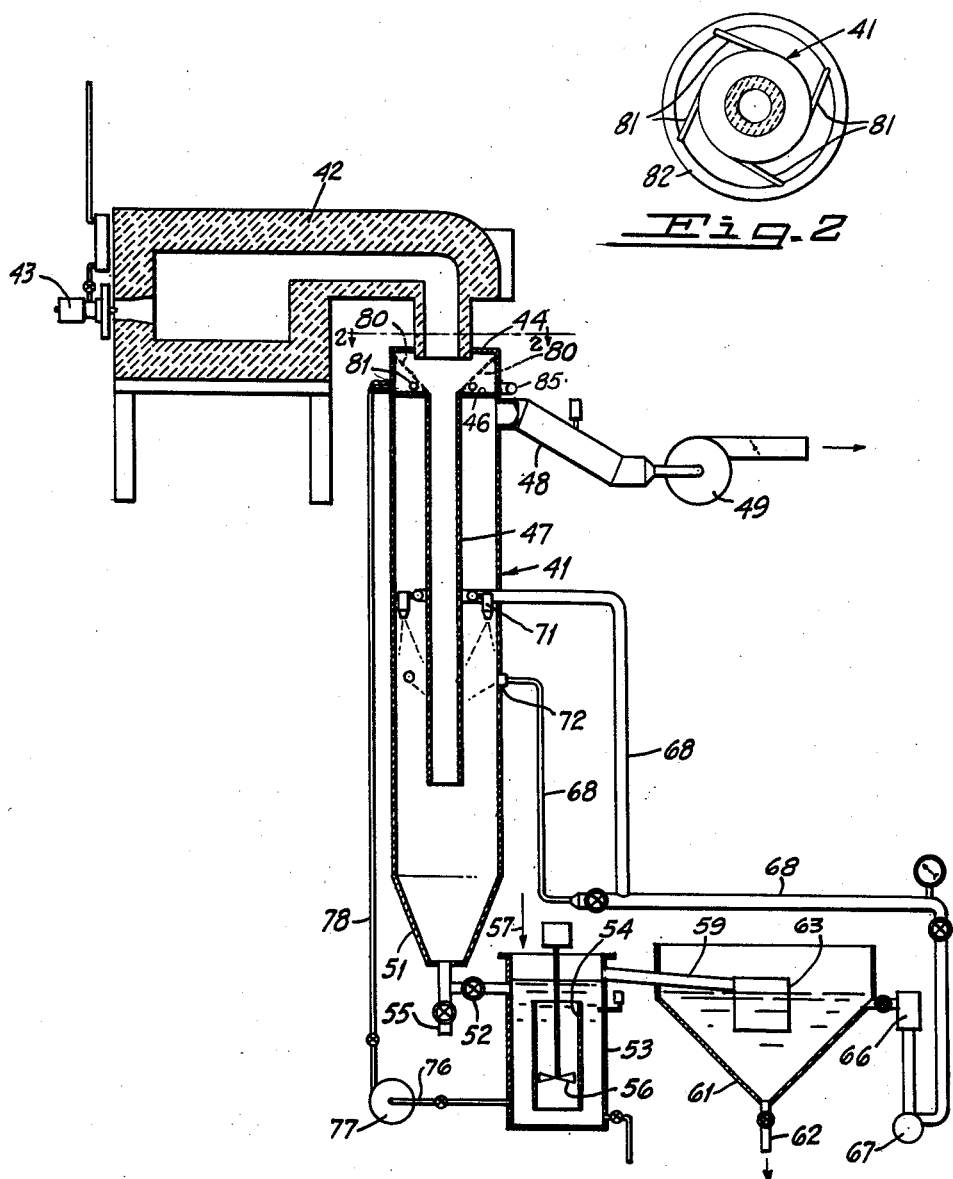

June 2, 1953 J. V. WISEMAN 2,640,761
EVAPORATING APPARATUS

Filed Nov. 25, 1949 2 Sheets-Sheet 1

INVENTOR.
JAMES V. WISEMAN
BY
Robert A. Bennoff
ATTORNEY

June 2, 1953  J. V. WISEMAN  2,640,761
EVAPORATING APPARATUS
Filed Nov. 25, 1949  2 Sheets-Sheet 2
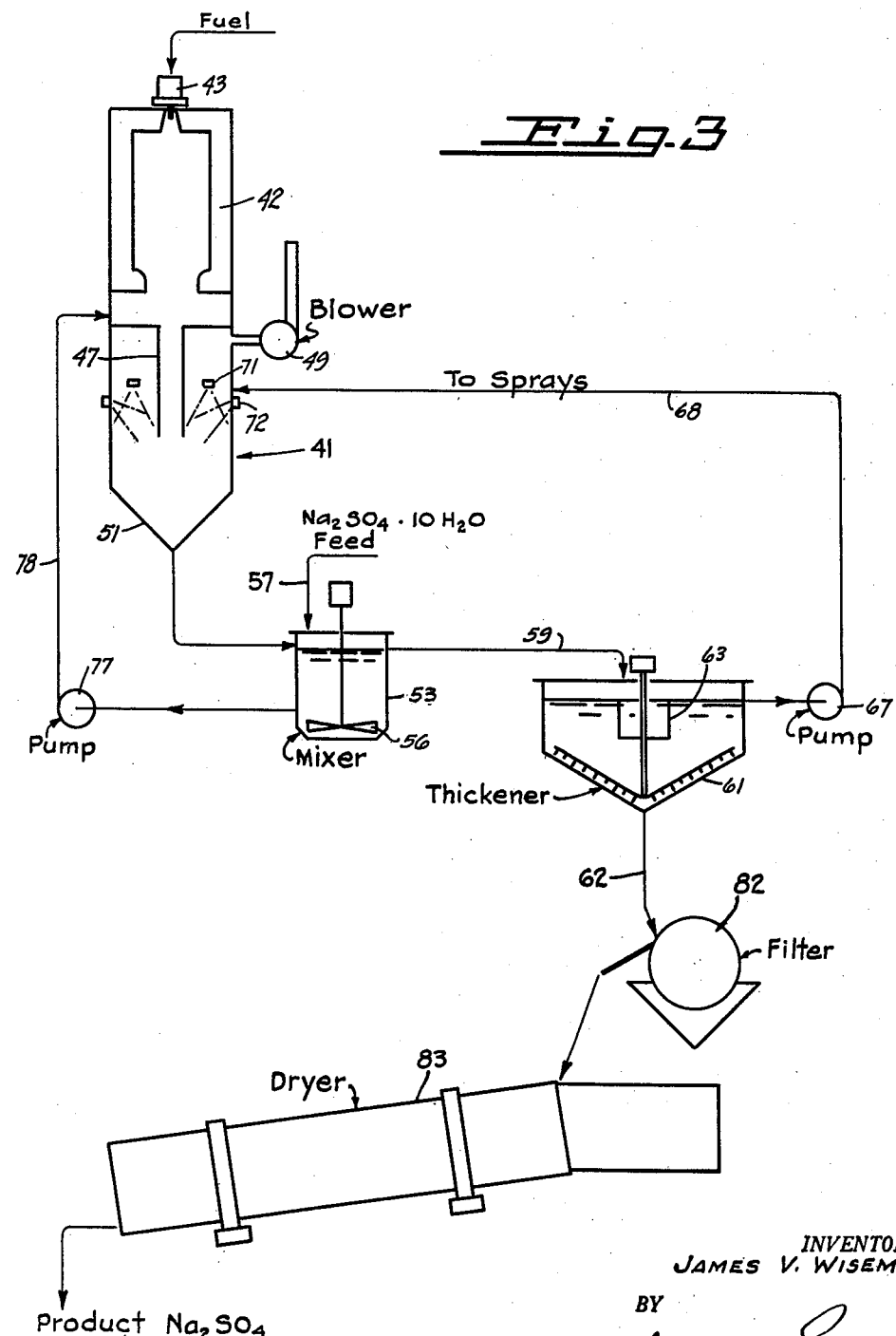

Patented June 2, 1953

2,640,761

UNITED STATES PATENT OFFICE 2,640,761

EVAPORATING APPARATUS

James V. Wiseman, Westend, Calif., assignor to West End Chemical Company, a corporation of California Application November 25, 1949, Serial No. 129,393

3 Claims. (Cl. 23—275)

This invention relates to apparatus for the concentration and evaporation of solutions of salts and which is particularly applicable to the production of anhydrous forms of salts having an inverted solubility or a negative temperature co-efficient of solubility curve, that is, the salt becomes less soluble as the solution temperature is increased.

Preparation of anhydrous forms of salts such as sodium sulfate decahydrate, sodium carbonate decahydrate and ferric sulfate septahydrate presents special difficulties when attempted by evaporation, using heat transfer through a solid wall. Salts having a normal solubility curve may readily be dehydrated by such means as a multiple-effect evaporator or other apparatus in which heat is transferred through a metallic wall to raise the temperature above the boiling point of the solution and thus to evaporate the liquid from the solute. When this is attempted with salts such as those mentioned, however, the salt, being less soluble at the higher temperature directly adjacent to the wall than at a somewhat lower temperature existing a very short distance from the wall, deposits upon the heat transfer wall. The salt, not being an effective conductor of heat, quickly decreases the efficiency of operation to such an extent as to make its cost excessive. This necessitates frequent shutdown of the apparatus and removal of the salt scale or film on the wall, as by boiling out or actual hand scraping. Not only is a portion of the product lost in this fashion, but the shutdown time and the expense of operation is increased greatly.

There are other methods for recovering the anhydrous salts from their hydrated form, but all have disadvantages. For example, sodium sulfate may be salted out by the use of solid sodium chloride, but not only is approximately 30% of the sodium sulfate lost, but the sodium chloride is not recovered. The process accordingly depends upon a plentiful supply of comparatively cheap solid sodium chloride.

I have found that difficultly concentrated materials, such as the aforementioned salts, which have negative temperature coefficients of solubility, can be evaporated successfully if the liquid to be concentrated is brought into contact with a relatively hot dry gas under such conditions that the gas is (a) cooled to the desired temperature of the effluent liquid, (b) saturated with water at such temperature and (c) all surfaces confining the hot gas in the presence of the liquid are maintained wet with sufficient of a film of the liquid to prevent the salt from precipitating from the liquid film onto such surface. If these conditions are observed, then the concentrating operation can be carried on continuously, the water evaporated from the solution being carried off in the effluent hot saturated gas stream.

The liquid removed from the evaporator is saturated with respect to the salt and contains some of the salt crystals in suspension. Additional salt is recovered by adding make-up hydrated salt at this point. In the case of sodium sulfate decahydrate, this gives up its water of crystallization above 32.5° C. so that the solution joins additional water and sodium sulfate, the solution being at a temperature substantially above this transition temperature. The salt which precipitates is separated, the remaining solution then being returned for evaporative removal of the water added as water of crystallization. In this manner a continuous and trouble-free process can be practiced.

It is an object of this invention to provide an apparatus to evaporate the water from the hydrated form of salts, and particularly one having an inverted solubility curve, while substantially completely avoiding the caking-up of the salt on the walls of the container in which evaporation is carried out.

It is a further object of the invention to provide an apparatus for dehydrating salts by the application of heat directly to the solution and not through the medium of a solid wall.

A further and more specific object of the invention is to provide an economically feasible and practicable apparatus for dehydrating sodium sulfate decahydrate and sodium carbonate decahydrate by the use of heat to evaporate the water therefrom.

A further and additional object of the invention is to provide apparatus capable of extended periods of use in evaporating water from solutions of salts in water without necessary shutdown for washing out or other cleaning.

Other objects of the invention will appear as the description proceeds. The invention will be particularly described as it has been applied to dehydration of sodium sulfate decahydrate but this is only for purposes of illustration although the apparatus is particularly suited to this.

In the drawing, Figure 1 is a side elevation partly in section illustrating somewhat schematically an evaporation construction, while Figure 2 is a section taken along the line 2—2 in Figure 1. Figure 3 is a flow sheet showing the evaporator and other apparatus and their method of operation for carrying out the process. The evaporating furnace shown in the drawing, particularly in Figure 1, includes a tubular metal shell positioned vertically and indicated by numeral 41. Combustion gases from a fire box 42 are supplied by a suitable fuel burner 43, being discharged into the upper end of the tubular shell. Adjacent the upper end 44 of the shell is provided an annular baffle 46 having a central tube or pipe 47 depending toward the lower end of the tubular shell 41. An outlet for combustion gases is provided in the side of the tubular shell 41 just below the annular baffle 46, this being shown as a conduit 48 connected to the inlet of a blower 49. The lower end of the tubular shell is preferably tapered inwardly as at 51 and a drain 55 and an outlet 52 are provided, the outlet feeding directly into mixing tank 53. The mixing tank includes a central well 54 and a stirring device 56 operating within the well. Feed is introduced into the mixing tank through line 57 while the overflow from the tank is passed through line 59 into a central well 63 in a thickener or settling tank 61, from which the product is drawn off through line 62.

The overflow from the settling tank is sent back through line 66, pump 67 and line 68 and is introduced into the evaporating chamber in the space between the central tube 47 and the tubular vessel 41 at an upper level by several spray nozzles 71 discharging into the space between the pipe 47 and the tubular shell 41 and at a lower level, by several spray nozzles 72 discharging inwardly from the side of the shell 41 and onto the lower end of the pipe to maintain this covered with a liquid film. In addition, a portion of the material in the mixer tank is taken off through line 76 and returned by pump 77 through line 78 and header 85 to discharge through tangential outlets 81 placed at equal distances around the tubular vessel 41 and closely adjacent to the annular baffle 46; material can be taken from the settling tank to line 76 if desired.

In operation, the burner was operated to discharge combustion gases near 2,000° F. into the upper portion of the tubular vessel. The tubular vessel 41 was 16' long and 3' in diameter. Baffle 46 was placed a foot from the upper end of the shell while pipe 47 was 10' long and 10" in diameter. The return material supplied through the four tangential outlets 81 was discharged at such a rate that the spiraling material, held by centrifugal force, built up in the interior of the vessel and stood on the annular baffle at approximately an angle of 45° and along the dotted line indicated at 80. The liquid flowed down over the interior of the pipe 47, sufficient liquid being introduced to maintain the inner surface of the pipe 47 wet with liquid so that this surface did not become dry and so that it did not attain the temperature of the combustion gases; to the same end, nozzles 72 maintained the lower end of the pipe wet. All portions of the shell and pipe which could serve as loci for salt crystallization are maintained wet with sufficient liquid so that heat transfer cannot occur except through a liquid film to the metal surface. Wetting the metal surfaces with sufficient liquid prevents any heat transfer through the tube and so prevents the salt from crystallizing out upon the surface of the tube. The gases which pass upwardly between the tubular vessel 41 and the pipe 47 become saturated with water, issuing from the blower at about 180° F.

Material from the settling tank is passed through line 62 to filter 82 and the crystals are then dried on dryer 83.

In a specific operation the apparatus described above was operated using a sodium sulfate decahydrate feed. This was fed into mixing tank 53 at the rate of 1140 pounds per hour. Oil fuel was used in burner 43 and at a rate of 6.8 gallons per hour thus releasing 965,000 B. t. u. per hour. Material was returned from the mixer 53 to the upper portion of the evaporator through pump 77 at the rate of 40 gallons per minute. Solution from the settling tank was supplied to the sprays at 165° F. through pump 67 at the rate of 35 gallons per minute. The temperature of the saturated gases to the blower 49 was 160° F. and these gases were exhausted at the rate of 680 C. F. M. These gases analyzed 6½% $CO_2$ on a dry basis. Water was evaporated at the rate of 628 pounds per hour in the process and anhydrous sodium sulfate was produced at the rate of 512 pounds per hour from dryer 83.

Since there is no heat transfer through a wall, it is evident that there is no tendency for caking, scale or film formation. The rate of feed of the hydrated salt as made up is readily determined for any given set of conditions and apparatus, it being only necessary to maintain the feed rate such that the liquid level in the thickener remains at the same elevation, or increase and decrease the heat input according to the feed rate.

The sodium sulfate decahydrate is fed into the mixing tank where it comes in contact with the saturated solution from the evaporator. Some of the heat from the solution is absorbed in melting and warming the feed material. The sodium sulfate decahydrate is added at such a rate as to supply the water that is evaporated in the evaporating chamber, thus there is no loss nor gain of circulating solution. The anhydrous sodium sulfate crystals are formed in the crystallizer and grow rapidly. The temperature of the resulting slurry is dependent upon the circulation rate of the solution and upon the amount of excess air admitted with the burner gases.

I have found that I have a measure of control of the crystal size by manipulation of the discharge temperature of the crystallizer. Rather coarse crystals of sodium sulfate are produced at 180° and become finer as the temperature is lowered to about 100° where the product is mostly a powder. Our preferred operating range is with a crystallizer discharge temperature of 130–185° F.

Since much more liquid is sprayed into the evaporating chamber than can be evaporated, it is not difficult to have a discharge gas that is saturated with water vapor. This makes for economical use of the fuel employed. While the apparatus as shown is adapted to the use of oil as a fuel it can easily be converted to use with any other type of fuel solid, liquid or gaseous. Fuel efficiencies of 95% and better can easily be attained with use of this apparatus. It will be evident that the flow sheet involves simple apparatus, and I have found that overall economy of operation is such as to enable us to produce anhydrous sodium sulfate at a cost less than that of other processes in present use. Heats of crystallization, solution, vaporization and solubilities of salts involved are the same using the method and apparatus herein described as with equipment and methods commonly employed and are, therefore, omitted from this description. These values can be found in any good textbook on the subject.

While apparatus has been described in connection with the dehydration of salts having an inverted solubility curve, and particularly sodium sulfate decahydrate, it will be evident that my invention is not so limited but that other salts, including those having normal solubility curves, may likewise be dehydrated to advantage by my process and by making use of my apparatus. I conceive my invention to be broadly directed to the concentration of solutions of salts in water. The method of evaporation is disclosed and claimed in my copending divisional application, Serial No. 236,608, filed July 13, 1951.

I claim:

1. Concentrating apparatus comprising a vertical tubular metal shell having an upper end and a lower end, a pipe having an upper and a lower end and depending concentrically in said tubular metal shell in a spaced relation to each end of said shell to provide a gas space therebetween, an inverted truncated cone having its upper end joined to the upper end of said shell and its lower end joined to the upper end of said pipe to provide a closure between said shell and said pipe, means for discharging a hot dry gas into said cone at the upper end of said tubular metal shell, means for discharging a liquid to be evaporated onto the upper surface of said cone to maintain said cone and said pipe completely covered with a liquid film, means for spraying additional liquid into the gas space between the shell and the pipe, means for collecting and withdrawing concentrated liquid at the bottom of the shell, and means for withdrawing relatively cold wet gas from between the pipe and shell adjacent the underside of said cone.

2. Concentrating apparatus comprising a vertical pipe having an upper and a lower end, a tubular shell having an upper and a lower end and concentrically positioned with respect to the pipe and extending beyond each end of the pipe, a baffle joining the inner wall of the tubular shell and the upper end of the pipe to form a chamber at the upper end of the shell, a combustion chamber for discharging directly hot dry products of combustion into the chamber, means for discharging a liquid to be concentrated into the chamber to cover the surface thereof with a liquid film and provide a complete liquid film cover on the inner surface of the pipe, means for spraying additional liquid into the space between the pipe and the shell, means for withdrawing relatively cold wet products of combustion from the space between the pipe and the shell adjacent to the upper end of the pipe, and a closure at the lower end of the shell for collecting liquid.

3. Concentrating apparatus comprising a vertical pipe having an upper and a lower end, a tubular shell having an upper and a lower end and concentrically positioned with respect to the pipe and extending on each side of the pipe, an inverted conical frustrum having its upper end at the upper end of the shell and its lower end connected to the upper end of said pipe, a combustion chamber for discharging hot dry products of combustion into the conical frustrum, means for discharging a liquid to be concentrated onto the surface of the conical frustrum to cover the surface thereof with a film and to provide a complete liquid film cover on the inner surface of the pipe, means for spraying additional liquid into the space between the pipe and the shell, means for withdrawing relatively cold wet products of combustion from the space between the pipe and the shell adjacent to the upper end of the pipe, and a closure at the lower end of the shell for collecting liquid.

JAMES V. WISEMAN.

References Cited in the file of this patent

UNITED STATES PATENTS

| Number | Name | Date |
|---|---|---|
| 1,172,429 | Carrier | Feb. 22, 1916 |
| 1,516,444 | Lough | Nov. 18, 1924 |
| 1,711,306 | Bowen | Apr. 30, 1929 |
| 1,933,254 | Goodell | Oct. 31, 1933 |
| 1,952,308 | Bowen | Mar. 27, 1934 |
| 2,459,302 | Aronson | Jan. 18, 1949 |
| 2,504,097 | Wiseman | Apr. 11, 1950 |